United States Patent Office 3,486,837
Patented Dec. 30, 1969

3,486,837
PROCESS FOR DYEING AND PRINTING POLYESTER TEXTILE MATERIALS WITH 2-ARYLSULFONYL ANTHRAQUINONE DYESTUFFS
Rütger Neeff, Wilhelm Gohrbandt, Leverkusen, and Robert Kuth, Cologne-Muengersdorf, Germany, assignors to Farbenfabriken Bayer Aktiengesellschaft, Leverkusen, Germany, a corporation of Germany
No Drawing. Filed Mar. 30, 1965, Ser. No. 444,053
Claims priority, application Germany, Apr. 3, 1964,
F 42,508
Int. Cl. D06p 1/20
U.S. Cl. 8—39
6 Claims

ABSTRACT OF THE DISCLOSURE

Polyester materials are dyed and printed with a 1,4-diamino-2-phenylsulfonyl-anthraquinone or -chlorophenylsulfonyl-anthraquinone dyestuff by the thermosol process. The polyester materials may be polyethylene glycol terephthalate or cellulose triacetate materials and the resulting products which have fastness to light, washing, thermo-fixing and ironing.

---

The present invention is concerned with new anthraquinone dyestuffs which are suitable for dyeing and printing polyester materials by the thermosol process and is also concerned with the production of said new dyestuffs.

The new dyestuffs according to the present invention are compounds of the general formula

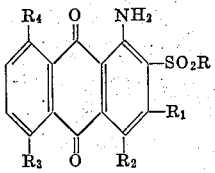

wherein R is selected from the group consisting of unsubstituted and substituted aryl, $R_1$ is selected from the group consisting of hydrogen, halogen, cyano, unsubstituted and substituted —$SR_5$ and —$SO_2R_5$, $R_5$ being selected from the group consisting of unsubstituted and substituted alkyl, aralkyl and aryl, $R_2$ is selected from the group consisting of hydrogen, hydroxyl, alkoxy, amino, and —NH—$SO_2$—aryl of which aryl can be substituted and $R_3$ and $R_4$ are each selected from the group consisting of hydrogen, nitro, amino and hydroxyl, $R_2$ and $R_4$ not being OH when $R_3$ is $NH_2$.

By the thermosol process there is to be understood the process in which the printed or dyed polyester materials, optionally after an intermediate drying, are heated for a short time to temperatures in the region of 180–200° C. In general, the heating is carried out for a period of 30 secs. to 1.5 to 2 minutes.

As polyester materials, there are particularly suitable the linear aromatic polyesters and, for example, cellulose esters, such as cellulose triacetate.

In the compounds according to the present invention, the aryl radicals, which are preferably phenyl or naphthyl radicals, can be substituted by one or more substituents of the most varied type. As examples, there can be mentioned the following substituents: halogen atoms, such as chlorine, bromine or fluorine atoms; alkyl radicals containing 1–6 carbon atoms which, in turn, can be substituted by halogen atoms or hydroxyl, alkoxy, cyano or carboxyalkyl radicals; phenyl or phenoxy radicals, hydroxy radicals, alkoxy radicals containing 1–6 carbon atoms which again can be substituted by halogen atoms or hydroxyl, alkoxy, cyano or carboxyalkyl radicals; nonesterified and esterified carboxyl groups, trifluoromethyl, acetyl or nitro groups and amino groups which may be substituted once or twice by alkyl-, hydroxyalkyl-, alkoxyalkyl-, cyanoalkyl or phenyl radicals. Examples of such substituents are methyl, ethyl, propyl, butyl, isobutyl and amyl groups; methoxy-, ethoxy-, cyano-, and ethoxycarbonylmethyl groups; methoxy, ethoxy, propoxy or butoxy radicals; hydroxy-, methoxy-, ethoxy-, and butoxy-ethoxy groups; chloro-, bromo-, cyano- and methoxycarbonylethoxy groups; and dimethyl-, diethyl-, dihydroxyethyl-, dimethoxyethyl- and dicyanoethyl- and phenyl-amino groups.

In the case of the alkyl radicals, they preferably contain 1–6 carbon atoms, whereby the alkyl radical can again be further substituted, for example, by halogen atoms, or hydroxy, alkoxy, hydroxyalkylenoxy, alkoxyalkylenoxy, cyano or carboxyalkyl groups or by amino groups optionally substituted by alkyl, hydroxyl, alkoxyalkyl or cyanoalkyl radicals.

The compounds according to the present invention are obtained, for example, when compounds of the general formula:

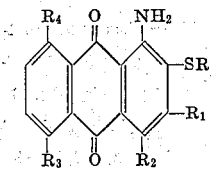

in which the radicals R, $R_1$, $R_2$, $R_3$ and $R_4$ have the same means as above, are oxidised in known manner, for example, with hydrogen peroxide.

The dyeings obtained on polyester materials with the new dyestuffs according to the present invention possess very good drawing and texture properties; the dyeings, which are obtained with very good dye yields, possess outstanding light, washing, thermo-fixing and ironing fastnesses.

The following example is given for the purpose of illustrating the present invention; the parts and percentages being by weight unless otherwise indicated:

EXAMPLE (a) A fabric of polyethylene terephthalate fibres is impregnated on a foulard with a dye bath which contains, per litre, 20 g. 1,4-diamino-2-phenylsulphonyl-anthraquinone, as well as 10 g. of a thermosol adjuvant, especially a polyether such as is described, for example, in Belgian patent specification No. 615,102. The fabric is then squeezed to an increase in weight of 70% and dried at 80–120° C. in a moving jet drier or drying cupboard. Subsequently, the fabric is dried with hot air for about 45 seconds at 190–200° C. in a tenter or nozzle hot flue, thereafter rinsed, optionally subjected to a reductive treatment, washed, rinsed and dried. The reductive after-treatment for the purpose of removing dyestuff particles attached to the surfaces of the fibres can be carried out by introducing the fabric at 25° C. into a bath containing 3–5 cc. per litre sodium hydroxyl solution (38° Bé.) and 1–2 g. per litre concentrated sodium hydrosulphite solution, heated to 70° C. within a period of about 15 minutes and maintained for a further 10 minutes at 70° C. The fabric is subsequently hot rinsed, treated at 50° C. with 2–3 cc. per litre 85% formic acid, rinsed and dried.

There is obtained a brilliant reddish-blue dyeing which is characterised by a high dyestuff yield and texture property, as well as by outstanding fastnesses, especially very good thermofixing and light fastnesses.

In a similar manner, a very full brilliant reddish-blue dyeing is obtained when, instead of the propylene ether fibres, cellulose triacetate fibres are used and the thermosol process carried out at 215° C.

(b) A previously cleaned and thermofixed fabric of polyethylene terephthalate fibres is printed with a printing paste which consists of 40 g. 1,4-diamino-2-phenylsulphonyl-anthraquinone, 475 g. water, 465 g. crystal rubber (1:2) and 20 g. sulphonated castor oil. Instead of crystal rubber, there can also be used an alginate thickener. For fixing the dyestuff, the printed and dried material is passed at 190–200° C. over a high capacity tenter or through a condensation apparatus. The treatment period is 30–60 seconds. The fixed print obtained is subsequently cold raised with 1–2 g. per litre ion-active detergent at 70–80° C. for about 10 minutes, first hot rinsed and then cold rinsed and dride.

There is obtained a print analogous to the dyeing of Example 1(a), which is characterised by the same outstanding fastnesses.

In the same way, a very full brilliant reddish-blue print is obtained when, instead of the polyethylene terephthalate fibres, there are used cellulose triacetate fibres.

(c) In the following table there are given the shades which are obtained in the case of dyeing with the dyestuffs mentioned below according to the methods of Examples 1(a) and (b):

| | Dyestuff | Shade |
|---|---|---|
| 2 | 1,4-diamino-2-(4'-chloro)-phenylsulphonyl-anthraquinone. | Reddish-blue. |
| 3 | 1,4-diamino-2-(2'-chloro)-phenylsulphonyl-anthraquinone. | Do. |
| 4 | 1,4-diamino-2 (3'-bromo)-phenylsulphonyl-anthraquinone. | Do. |
| 5 | 1,4-diamino-2-(3'-fluoro)-phenylsulphonyl-anthraquinone. | Do. |
| 6 | 1,4-diamino-2-(4'-methyl)-phenylsulphonyl-anthraquinone. | Do. |
| 7 | 1,4-diamino-2-(4'-ethyl)-phenylsulphonyl-anthraquinone. | Do. |
| 8 | 1,4-diamino-2-(4'-isobutyl)-phenylsulphonyl-anthraquinone. | Do. |
| 9 | 1,4-diamino-2-(3'-trifluormethyl)-phenylsulphonyl-anthraquinone. | Do. |
| 10 | 1,4-diamino-2-(4'-methoxymethyl)-phenylsulphonyl-anthraquinone. | Do. |
| 11 | 1,4-diamino-2-(4'-ethoxymethyl)-phenylsulphonyl-anthraquinone. | Do. |
| 12 | 1,4-diamino-2-(4'-β-ethoxyethyl)-phenylsulphonyl-anthraquinone. | Do. |
| 13 | 1,4-diamino-2-(4'-cyanomethyl)-phenylsulphonyl-anthraquinone. | Do. |
| 14 | 1,4-diamino-2-(4'-ethoxycarbonylmethyl)-phenylsulphonyl-anthraquinone. | Do. |
| 15 | 1,4-diamino-2-(4'-phenoxy)-phenylsulphonyl-anthraquinone. | Do. |
| 16 | 1,4-diamino-2-(4'-methoxy)-phenylsulphonyl-anthraquinone. | Do. |
| 17 | 1,4-diamino-2-(4'-ethoxy)-phenylsulphonyl-anthraquinone. | Do. |
| 18 | 1,4-diamino-2-(4'-β-methoxyethoxy)-phenylsulphonyl-anthraquinone. | Do. |
| 19 | 1,4-diamino-2-(4'-β-butoxyethoxy)-phenylsulphonyl-anthraquinone. | Do. |
| 20 | 1,4-diamino-2-(4'-β-hydroxyethoxy)-phenylsulphonyl-anthraquinone. | Do. |
| 21 | 1,4-diamino-2-(4'-β-cyanethoxy)-phenylsulphonyl-anthraquinone. | Do. |
| 22 | 1,4-diamino-2-(4'-β-ethoxycarbonylethoxy)-phenylsulphonyl-anthraquinone. | Do. |
| 23 | 1,4-diamino-2-(4'-hydroxy)-phenylsulphonyl-anthraquinone. | Do. |
| 24 | 1,4-diamino-2-(3'-ethoxycarbonyl)-phenylsulphonyl-anthraquinone. | Do. |
| 25 | 1,4-diamino-2-(4'-hydroxy-3'-carboxy)-phenylsulphonyl-anthraquinone. | Do. |
| 26 | 1,4-diamino-2-(3'-nitro)-phenylsulphonyl-anthraquinone. | Do. |
| 27 | 1,4-diamino-2-(2'-chloro-5'-nitro)-phenylsulphonyl-anthraquinone. | Do. |
| 28 | 1,4-diamino-2-(3'-acetyl)-phenylsulphonyl-anthraquinone. | Do. |
| 29 | 1,4-diamino-2-(3'-amino)-phenylsulphonyl-anthraquinone. | Do. |
| 30 | 1,4 diamino-2-(4'-N-β-dihydroxy ethylamino)-phenylsulphonyl-anthraquinone. | Do. |
| 31 | 1,4-diamino-2-(4'-N-β-biscyanoethylamino)-phenylsulphonyl-anthraquinone. | Do. |
| 32 | 1,4-diamino-2-(4'-N-β-bismethoxyethylamino)-phenylsulphonyl-anthraquinone. | Do. |
| 33 | 1,4-diamino-2-(4'-phenylamino)-phenylsulphonyl-anthraquinone. | Do. |
| 34 | 1,4-diamino-2-(2'5'-dichloro)-phenylsulphonyl-anthraquinone. | Do. |
| 35 | 1,4-di-(amino-2-α-naphthyl-sulphonyl)-anthraquinone. | Blue. |
| 36 | 1,4-diamino-2 (6' chloro β naphthylsulphonyl) anthraquinone. | Do. |
| 37 | 1,4-diamino-2-(4'-chloro)-benzylsulphonyl-anthraquinone. | Reddish-blue. |
| 38 | 1,4-diamino-2-(4'-β-chloroethoxy)-phenylsulphonyl-anthraquinone. | Do. |
| 39 | 1,4-diamino-2-(2'4'6'-trimethyl)-phenylsulphonyl-anthraquinone. | Reddish-blue. |
| 40 | 1,4-diamino-2-(4'-carbethoxy)-phenylsulphonyl-anthraquinone. | Do. |
| 41 | 1,4-diamino-2-(4'-chloro)-phenylsulphonyl-3-chloro-anthraquinone. | Do. |
| 42 | 1,4-diamino-2-phenylsulphomyl-3-phenylthio-anthraquinone. | Do. |
| 43 | 1,4-diamino-2-(4'-methoyx)-phenylsulphonyl-3-phenylsulphonyl-anthraquinone. | Do. |
| 44 | 1,4-diamino-2-phenylsulphonyl-5-nitro-anthraquinone. | Blue. |
| 45 | 1,4-diamino-2-(4'-chloro)-phenylsulphonyl-5-nitro-anthraquinone. | Do. |
| 46 | 1,4-diamino-2-(3'-fluoro)-phenylsulphonyl-5-nitro-anthraquinone. | Do. |
| 47 | 1,4-diamino-2-(4'-methoxymethyl)-phenylsulphonyl-5-nitro-anthraquinone. | Do. |
| 48 | 1,4-diamino-2-(4'-methyl)-phenylsulphonyl-5-nitro-anthraquinone. | Do. |
| 49 | 1,4-diamino-2-(4'-ethoxycarbonylmethyl)-phenylsulphonyl-5-nitro-anthraquinone. | Do. |
| 50 | 1,4-diamino-2-(4'-methyl)-phenylsulphonyl-3-cyano-anthraquinone. | Reddish-blue. |
| 51 | 1,4-diamino-2-(4'-methoxy)-phenylsulphonyl-5-nitro-anthraquinone. | Blue. |
| 52 | 1,4-diamino-2-(4'-β-hydroxyethoxy)-phenylsulphonyl-5-nitro-anthraquinone. | Do. |
| 53 | 1,4-diamino-2-phenylsulphonyl-3-bromo-5-nitro-anthraquinone. | Do. |
| 54 | 1,4-diamino-2-phenylsulphonyl-3-methyl-sulphonyl-5-nitro-anthraquinone. | Do. |
| 55 | 1,4-diamino-2-(4'-N-dihydroxyethylamino)-phenylsulphonyl-5-nitro-anthraquinone. | Do. |
| 56 | 1,4,5-triamino-2-(4'-methoxy)-phenylsulphonyl-anthraquinone. | Do. |
| 57 | 1,4,5-triamino-2-(4'-carbomethoxy)-phenylsulphonyl-anthraquinone. | Do. |
| 58 | 1,4,5-triamino-2-phenylsulphonyl-anthraquinone. | Do. |
| 59 | 1,4,5-triamino-2-(4'-chloro)-phenylsulphonyl-anthraquinone. | Do. |
| 60 | 1,4-diamino-2-phenylsulphonyl-3-cyano-5-nitro-anthraquinone. | Do. |
| 61 | 1,4-diamino-2-phenylsulphonyl-5,8-dichloro-anthraquinone. | Reddish-blue. |
| 62 | 1,4-diamino-2-(4'-chloro)-phenylsulphonyl-5,8-dichloro-anthraquinone. | Do. |
| 63 | 1,4-diamino-2-(4'-hydroxy)-phenylsulphonyl-5,8-dichloro-anthraquinone. | Do. |
| 64 | 1,4-diamino-2-phenylsulphonyl-5,8-dibromo-anthraquinone. | Do. |
| 65 | 1,8-diamino-4,5-dihydroxy-2-phenylsulphonyl-anthraquinone. | Blue. |
| 66 | 1,8-diamino-4,5-dihydroxy-2-(4'chloro)-phenylsulphonyl-anthraquinone. | Do. |
| 67 | 1,8-diamino-4,5-dihydroxy-2-(4'-methoxy)-phenylsulphonyl-anthraquinone. | Do. |
| 68 | 1,8-diamino-4,5-dihydroxy-2-(4'-methoxyethoxy)-phenylsulphonyl-anthraquinone. | Do. |
| 69 | 1,8-diamino-4,5-dihydroxy-2-(3'-carbethoxy)-phenylsulphonyl-anthraquinone. | Do. |
| 70 | 1,8-diamino-4,5-dihydroxy-2-(4'-hydroxy)-phenylsulphonyl-anthraquinone. | Do. |
| 71 | 1,8-diamino-4,5-dihydroxy-2-(4'-ethoxy)-phenylsulphonyl-anthraquinone. | Do. |
| 72 | 1,8-diamino-4,5-dihydroxy-2-(4'-hydroxyethoxy)-phenylsulphonyl-anthraquinone. | Do. |
| 73 | 1,8-diamino-4,5-dihydroxy-2-(3'-nitro)-phenylsulphonyl-anthraquinone. | Do. |
| 74 | 1-amino-4-hydroxy-2-phenylsulphonyl-anthraquinone. | Bluish-red. |
| 75 | 1-amino-4-hydroxy-2-(4'-chloro)-phenylsulphonyl-anthraquinone. | Do. |
| 76 | 1-amino-4-hydroxy-2-(4'-hydroxy)-phenylsulphonyl-anthraquinone. | Do. |
| 77 | 1-amino-4-hydroxy-2-(4'-β-hydroxyethoxy)-phenylsulphonyl-anthraquinone. | Do. |
| 78 | 1-amino-4-hydroxy-2-(4'-β-ethoxyethoxy)-phenylsulphonyl-anthraquinone. | Do. |
| 79 | 1-amino-4-hydroxy-2-(4'-β-methoxy-β-ethoxyethoxy)-phenylsulphonyl-anthraquinone. | Do. |
| 80 | 1-amino-4-hydroxy-2-(4'-phenoxy)-phenylsulphonyl-anthraquinone. | Do. |
| 81 | 1-amino-4-hydroxy-2-(3'-cyano)-phenylsulphonyl-anthraquinone. | Do. |
| 82 | 1-amino-4-hydroxy-2-(3'-carbethoxy)-phenylsulphonyl-anthraquinone. | Do. |
| 83 | 1-amino-4-methoxy-2-phenylsulphonyl-anthraquinone. | Do. |
| 84 | 1-amino-4-ethoxy-2-phenylsulphonyl-anthraquinone. | Do. |
| 85 | 1-amino-4-benzene-sulphonamido-2-phenylsulphonyl-anthraquinone. | Red. |
| 86 | 1-amino-4-p-toluenesulphonamido-2-phenylsulphonyl-anthraquinone. | Do. |
| 87 | 1-amino-4-benzene-sulphonamido-2-(4'-hydroxy)-phenylsulphonyl-anthraquinone. | Do. |
| 88 | 1-amino-4-(4'-hydroxyethoxy)-phenylsulphonyl-anthraquinone. | Do. |
| 89 | 1-amino-4-benzene-sulphonamido-2-(4'-chloro)-phenylsulphonyl-anthraquinone. | Do. |
| 90 | 1-amino-2-phenylsulphonyl-anthraquinone. | Reddish-yellow. |
| 91 | 1-amino-2-(4'-chloro)-phenylsulphonyl-anthraquinone. | Do. |
| 92 | 1-amino-2-(3'-nitro)-phenylsulphonyl-anthraquinone. | Do. |

| Dyestuff | Shade |
|---|---|
| 93.... 1-amino-2-(3'-carbethoxy)-phenylsulphonyl-anthraquinone. | Reddish-yellow. |
| 94.... 1-amino-2-(2'-chloro-5'-nitro)-phenylsulphonyl anthraquinone. | Do. |
| 95.... 1-amino-2-(4'-ethoxy)-phenylsulphonyl-anthraquinone. | Do. |
| 96.... 1-amino-2-(4'-β-hydroxyethoxy)-phenylsulphonyl-anthraquinone. | Do. |
| 97.... 1-amino-2-(4'-β-methoxyethoxy)-phenylsulphonyl-anthraquinone. | Do. |
| 98.... 1-amino-2-(4'-β-methoxy-β-ethoxyethoxy)-phenylsulphonyl-anthraquinone. | Do. |
| 99.... 1-amino-2-(4'-phenoxy)-phenylsulphonyl-anthraquinone. | Do. |
| 100... 1-amino-2-(4'-phenyl)-phenylsulphonyl-anthraquinone. | Do. |
| 101... 1-amino-2-(4'-β-cyanethoxy)-phenylsulphonyl-anthraquinone. | Do. |
| 102... 1-amino-2-(4'-hydroxy)-phenylsulphonyl-anthraquinone. | Do. |
| 103... 1-amino-2-(4'-ethoxycarbonylmethyl)-phenyl-sulphonyl-anthraquinone. | Do. |

(d) The production of the new dyestuffs according to the present invention is illustrated using, as an example, 1,4-diamino-2-phenylsulphonyl-anthraquinone. The other compounds can be obtained in an analogous manner.

30 parts 1,4-diamino-2-phenylthio-anthraquinone in 500 glacial acetic acid are mixed at 40–45° C. with 34 parts 30% hydrogen peroxide, heated to 95° C. in about one hour and maintained at this temperature for 6–8 hours. After cooling, the resultant 1,4-diamino-2-phenylsulphonyl anthraquinone is filtered off with suction, washed with water and dried.

We claim:
1. A process for dyeing and printing polyester textile materials which comprises applying a 1,4-diamino-2-phenylsulfonyl- or chlorophenylsulfonyl-anthraquinone dystuff to such polyester textile materials by the thermosol process, said dyestuff having the formula:

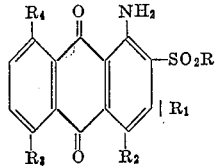

wherein R is unsubstituted or substituted phenyl or naphthyl, $R_1$ is hydrogen, halogen, cyano, unsubstituted or substituted $—SR_5$ or $—SO_2R_5$, $R_5$ being unsubstituted or substituted alkyl, aralkyl or aryl, $R_2$ is hydrogen, hydroxyl, alkoxy, amino, or $—NH—SO_2—$aryl of which aryl is unsubstituted or substituted and $R_3$ and $R_4$ are each hydrogen, nitro, amino or hydroxyl, $R_2$ and $R_4$ not being OH when $R_3$ is $NH_2$.

2. A process according to claim 1, wherein the dyestuff is applied to polyethylene glycol terephthalate textile materials.

3. A process according to claim 1, wherein the dyestuff is applied to cellulose triacetate textile materials.

4. Polyester textile materials printed and dyed by the thermosol process of claim 1.

5. A process according to claim 1, wherein the dyestuff is a 1,4-diamino-2-phenylsulfonyl-anthraquinone.

6. A process according to claim 1, wherein the dyestuff is 1,4-diamino-2-(4'-chlorophenylsulfonyl)-anthraquinone.

References Cited

UNITED STATES PATENTS 2,870,172  1/1959  Schoenauer _____ 8—39 X

FOREIGN PATENTS 1,268,400  6/1961  France.
1,332,541  6/1963  France.

GEORGE F. LESMES, Primary Examiner

T. J. HERBERT, JR., Assistant Examiner

U.S. Cl. X.R.

8—55, 57; 260—371, 373